United States Patent [19]

Cook et al.

[11] Patent Number: 5,515,828
[45] Date of Patent: May 14, 1996

[54] METHOD AND APPARATUS FOR AIR-FUEL RATIO AND TORQUE CONTROL FOR AN INTERNAL COMBUSTION ENGINE

[75] Inventors: Jeffrey A. Cook, Dearborn; Jessy W. Grizzle, Ann Arbor, both of Mich.

[73] Assignee: Ford Motor Company, Dearborn, Mich.

[21] Appl. No.: 355,736

[22] Filed: Dec. 14, 1994

[51] Int. Cl.$^6$ ...................................................... F02D 41/14
[52] U.S. Cl. ........................................... 123/436; 123/683
[58] Field of Search .................................... 123/435, 436, 123/679, 683, 687; 364/431.08

[56] References Cited

U.S. PATENT DOCUMENTS

| | | | |
|---|---|---|---|
| 4,000,756 | 1/1977 | Ule et al. | 123/90.11 |
| 4,718,015 | 1/1988 | Grob et al. | 123/436 |
| 4,962,741 | 10/1990 | Cook et al. | 123/673 |
| 4,971,011 | 11/1990 | Nanyoshi et al. | 123/436 |
| 5,146,888 | 9/1992 | Sawamoto | 123/436 |
| 5,226,390 | 7/1993 | Nakagawa | 123/436 |
| 5,265,575 | 11/1993 | Norota | 123/436 |
| 5,275,142 | 1/1994 | Kapellen et al. | 123/436 |

*Primary Examiner*—Willis R. Wolfe
*Attorney, Agent, or Firm*—Allan J. Lippa; Roger L. May

[57] ABSTRACT

An electronic engine controller (EEC) controls transient engine operation by generating a desired torque value which is indicative of an engine torque desired by a driver of the vehicle and by generating a desired air/fuel ratio value which is indicative of a desired air/fuel ratio to be combusted by the engine. The EEC also generates an actual torque value which is indicative of the actual engine torque and an actual air/fuel value which is indicative of the air/fuel ratio actually combusted by the engine. The actual A/F may be the output of a standard, switching type EGO sensor. An air/fuel difference value indicative of the difference between the actual air/fuel value and the desired air/fuel value is generated, and a torque difference value, indicative of the difference between the actual torque value and the desired torque value is generated. The air flow rate and the fuel flow rate into cylinders of the engine is calculated respectively as a function of the torque difference value and the air/fuel difference value. The engine may take one of many forms, including an engine where air flow and fuel flow rates may be controlled individually on a cylinder to cylinder basis.

14 Claims, 7 Drawing Sheets

METHOD AND APPARATUS FOR AIR-FUEL RATIO AND TORQUE CONTROL FOR AN INTERNAL COMBUSTION ENGINE

FIELD OF THE INVENTION

This invention relates to the field of electronic engine control and more particularly to techniques for controlling torque and air-fuel ratio during transient operation.

BACKGROUND OF THE INVENTION

In conventional internal combustion engines, control of the air/fuel ratio combusted by the engine during transient operation is typically achieved by measuring the mass flow rate of air into the intake manifold and generating an air flow value which is indicative of the air charge entering the cylinders of the engine per intake event. The correct amount of fuel to be injected for stoichiometric operation is then determined based on the air flow value and additional corrections for fuel wall wetting phenomena.

The primary impediment to accurate air/fuel control during transient operation is the accuracy of the air flow and fuel flow calculations. Moreover, even if the air flow and fuel flow calculations are correct for a particular vehicle, they may not be applicable for other vehicles due to vehicle-to-vehicle variation. In addition, aging of the vehicle causes further changes which affect the fuel and air flow rates. Conventional systems fail to account for such variations during transient engine operation because the control systems contain no mechanisms for measuring the accuracy of the air and fuel flow calculations. Accordingly, performance suffers and emissions increase during transient engine operation.

SUMMARY OF THE INVENTION

It is an object of the present invention to improve engine performance and fuel economy and reduce emissions during transient engine operation by use of a feedback mechanism which allows alteration of air and fuel flow rates into cylinders of the engine.

In accordance with the primary object of the invention, during engine operation a desired torque value which is indicative of an engine torque output desired by a driver of the vehicle is generated, and an actual torque value, indicative of an actual amount of torque generated by the engine is generated. A desired air/fuel mixture value, which is indicative of a desired exhaust gas composition to be generated by the engine is determined and an actual air/fuel mixture value, which is indicative of an actual exhaust gas composition generated by the engine is also determined. A torque difference value is then generated as a function of the difference between the desired torque value and the actual torque value, and an air/fuel difference value is generated as a function of the difference between the desired air/fuel difference value and the actual air/fuel difference value. The air flow rate and the fuel flow rate entering the cylinders are then determined respectively as a function of the torque difference value and air/fuel difference value.

An advantage of certain preferred embodiments is that enhanced power and reduced emissions can be achieved during transient operation by determining the air and fuel flow rates a functions of the actual engine torque output and air/fuel ratio.

In another aspect of the invention, air and fuel flow control on a cylinder by cylinder basis is employed to further enhance engine performance and fuel economy and to further reduce emissions.

These and other features and advantages of the present invention may be better understood by considering the following detailed description of a preferred embodiment of the invention. In the course of this description, reference will frequently be made to the attached drawings.

DETAILED DESCRIPTION

Figure 1:
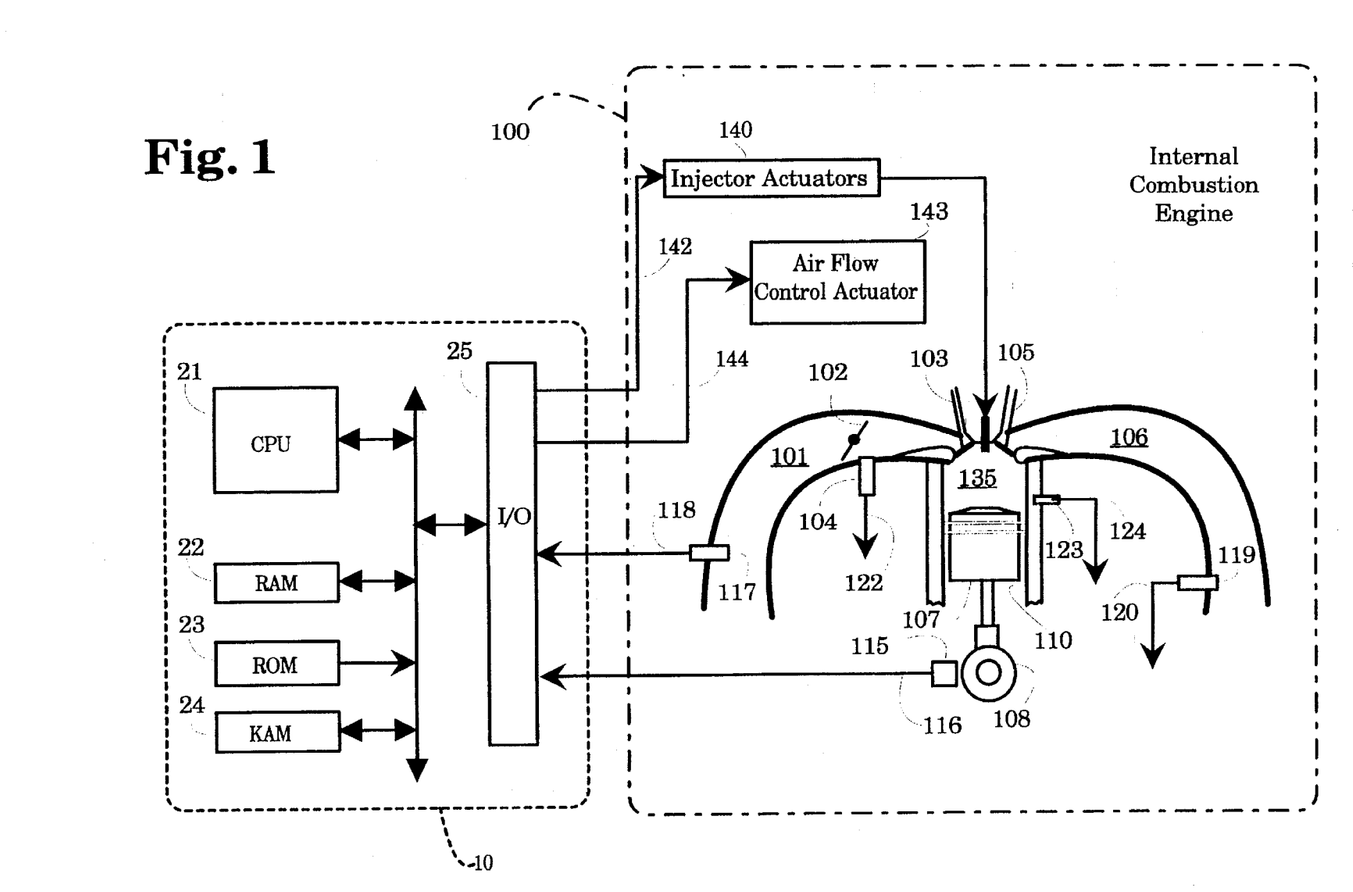
FIG. 1 of the drawings shows a schematic diagram of a preferred embodiment of portions of an internal combustion engine and an electronic engine controller which utilizes the principles of the invention.

FIG. 1 of the drawings shows an Electronic Engine Controller (EEC) 10 and an internal combustion engine 100. Engine 100 draws an aircharge through an intake manifold 123, past a throttle plate 102, an intake valve 103 and into combustion chamber 104. An air/fuel mixture which consists of the aircharge and fuel, is ignited in combustion chamber 104, and exhaust gas produced from combustion of the air/fuel mixture is transported past exhaust valve 105 through exhaust manifold 106. A piston 107 is coupled to a crankshaft 108, and moves in a linear fashion within a cylinder defined by cylinder walls 110.

A crankshaft position sensor 115 detects the rotation of crankshaft 108 and transmits a crankshaft position signal 116 to EEC 10. Crankshaft position signal 116 preferably takes the form of a series of pulses, each pulse being caused by the rotation of a predetermined point on the crankshaft past sensor 115. The frequency of pulses on the crankshaft position signal 116 are thus indicative of the rotational speed of the engine crankshaft. A Mass AirFlow (MAF) sensor 117 detects the mass flow rate of air into intake manifold 101 and transmits a representative signal 118 to EEC 10. MAF sensor 117 preferably takes the form of a hot wire air meter. A Heated Exhaust Gas Oxygen (HEGO) sensor 119 detects the concentration of oxygen in exhaust gas produced by the engine and transmits an exhaust gas composition signal 120 to EEC 10 which is indicative of the composition of the exhaust gas. A throttle position sensor 121 detects the angular position of throttle plate 102 and transmits a representative signal 122 to EEC 10. Throttle position sensor 121 preferably takes the form of a rotary potentiometer. An engine coolant temperature sensor 123 detects the temperature of engine coolant circulating within the engine and transmits a representative signal 124 to EEC 10. Engine coolant temperature sensor 123 preferably takes the form of a thermocouple.

Injector actuators 140 operate in response to fuel injector signal 142 to deliver an amount of fuel determined by fuel injector signal 142 to combustion chambers 104 of the engine. Airflow control actuators 143 operate in response to cylinder airflow signal 144 actuator signal to control the air flow rate into combustion chamber 135. Air flow control actuators 143 may take one of several forms, including a variable position camshaft which varies the camshaft timing to control the intake air charge entering cylinders of the engine. Air flow actuators 143 may also take the form of hydraulically actuated lifter valves used in a "camless" engine to control the opening and closing of the intake and exhaust valves.

EEC 10 includes a central processing unit (CPU) 21 for executing stored control programs, a random-access memory (RAM) 22 for temporary data storage, a read-only memory (ROM) 23 for storing the control programs, a keep-alive-memory (KAM) 24 for storing learned values, a conventional data bus, and I/O ports 25 for transmitting and receiving signals to and from the engine 100 and other systems in the vehicle.

Figure 2:
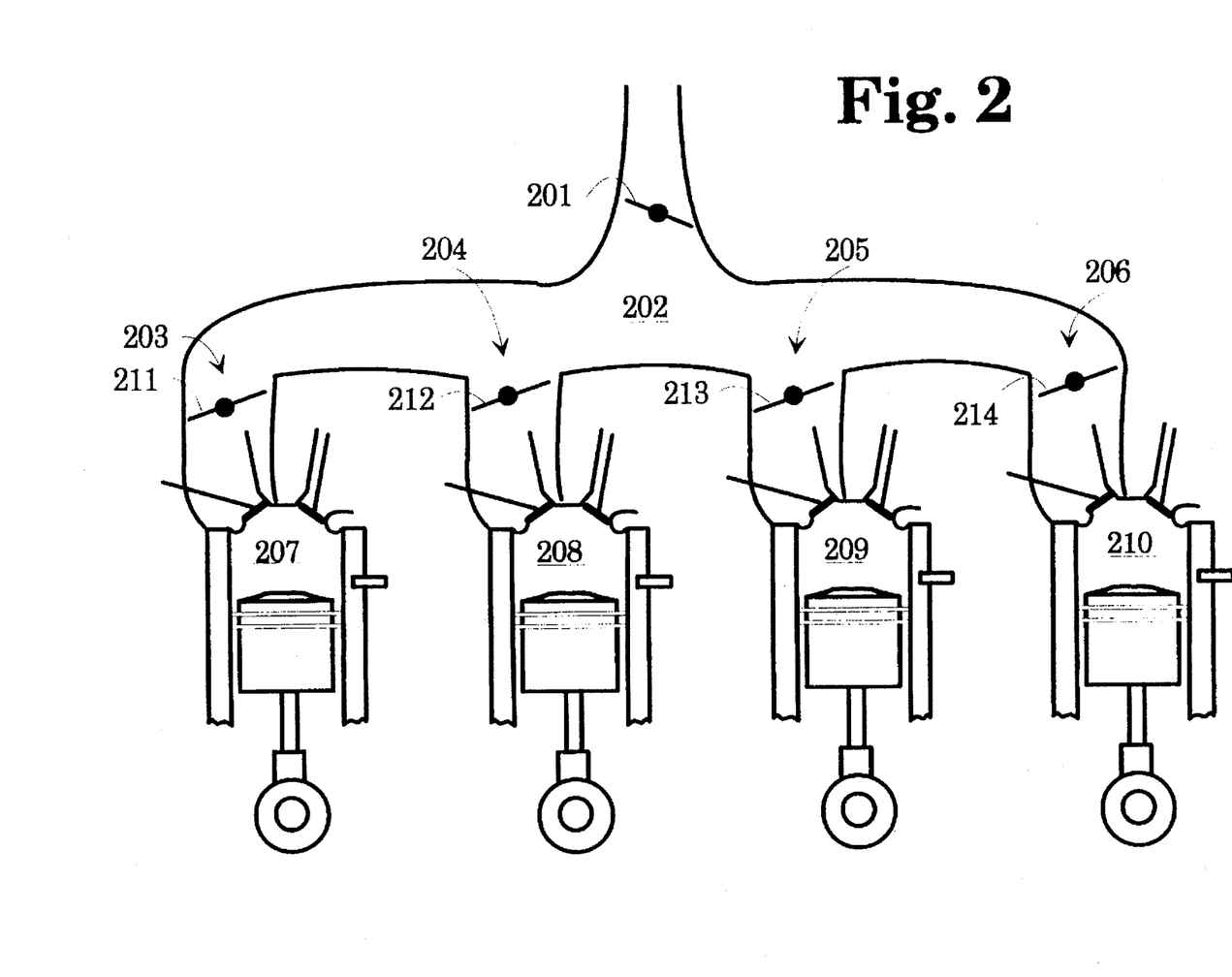
FIG. 2 is a schematic diagram of an intake manifold of a preferred embodiment.

FIG. 2 of the drawings is a schematic diagram of a intake manifold which may be used to advantage in accordance with the principles of the invention. A primary throttle 201 which rotates under driver operated control, controls the mass flow rate of air into the intake manifold 202 which includes a plurality of runners 203, 204, 205 and 206 for transporting the intake aircharge into a corresponding combustion chamber 207, 208, 209 and 210. Each runner has positioned therein a secondary throttle, seen at 211, 212, 213, and 214, which operate under electronic control to control the amount of intake aircharge entering the corresponding combustion chamber 207–210. The combination of primary, driver operated throttle 201 and secondary, electronically controlled throttles, 211–214 advantageously provide accurate control of the intake aircharge entering each cylinder while providing fail-safe operation. Driver operated primary throttle 201 has ultimate control of air entering the intake manifold 202, while secondary throttles 211–214 each have ultimate control of air entering the corresponding chambers 207–210. Thus the initial entry of air into the intake manifold 202 remains, as with conventional single throttle plate systems, under control of the driver, and failure of any of the secondary throttles results in improper operation of only the corresponding cylinder. Each of the secondary throttles 211–214 operates under control of a corresponding secondary throttle signal not shown, generated by EEC 10 in a manner to be described, which controls the angular position of the secondary throttle plate.

Figure 3:
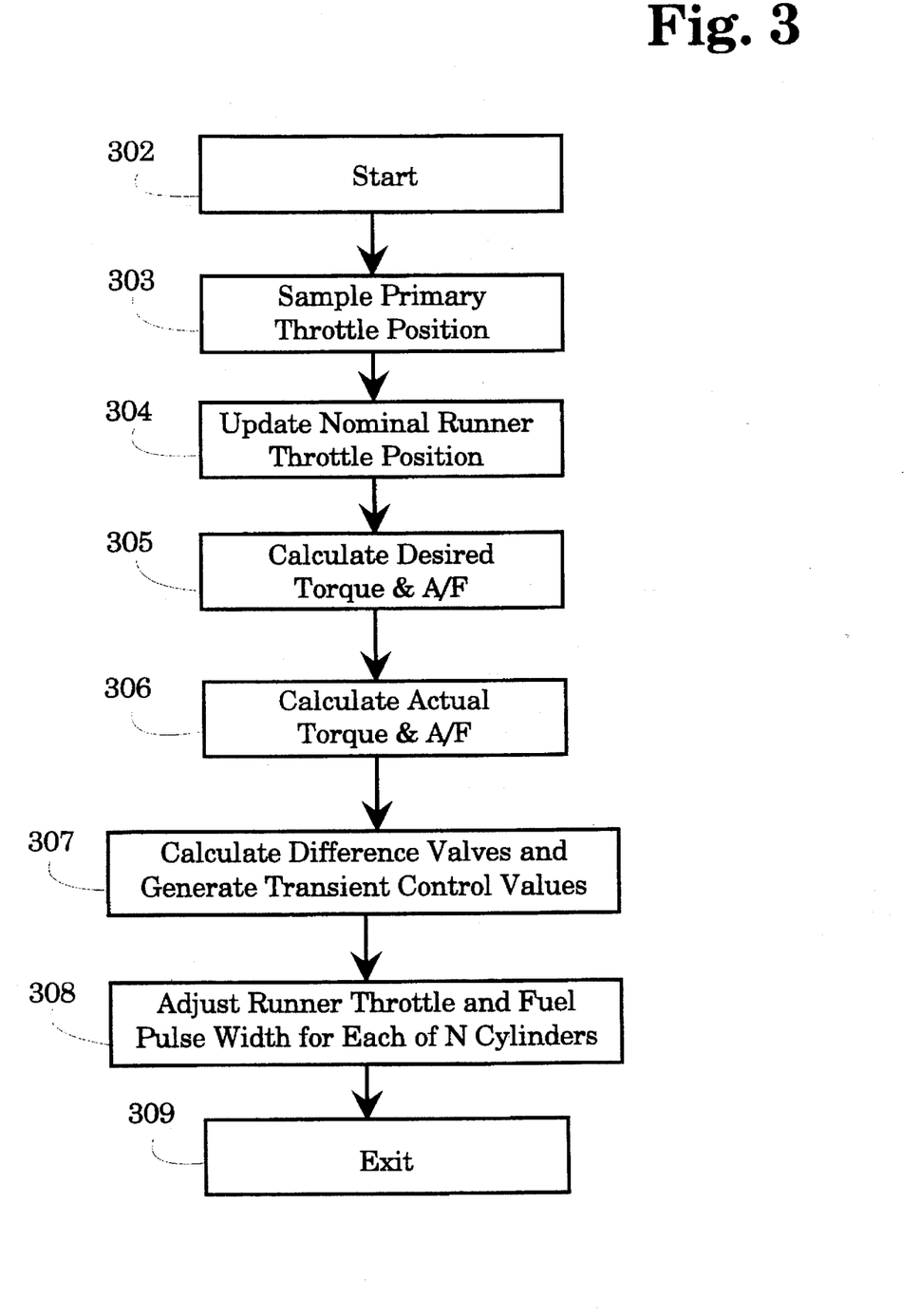
FIGS. 3, 4 and 5 are flowcharts showing the operation of a preferred embodiment.
Figure 5:
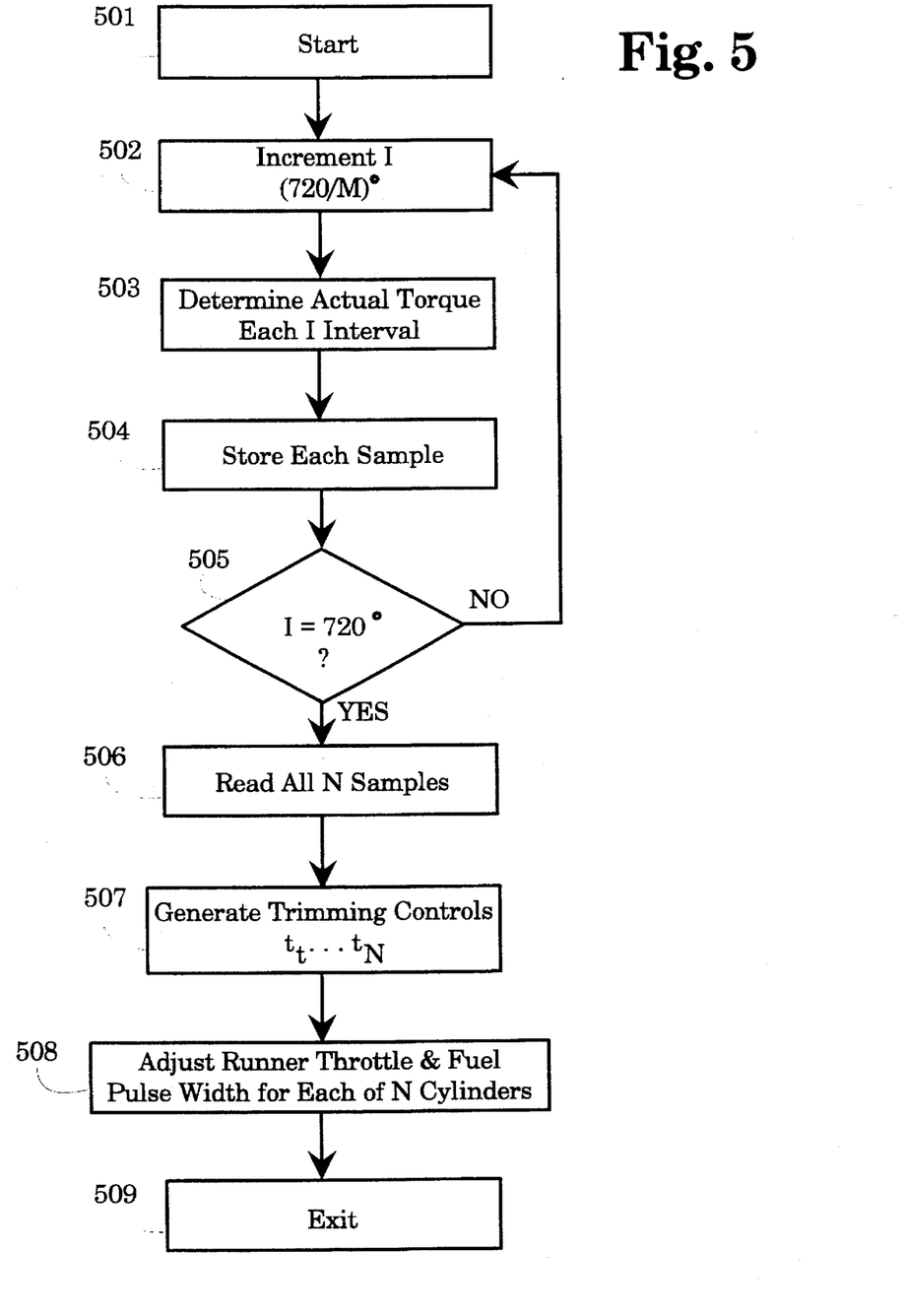

The arrangement of the secondary throttles at the inlet to each cylinder advantageously allows both transient and individual cylinder control tasks to be performed. Transient A/F and torque control is accomplished by actuating all of the secondary throttles 211–214 in unison in response to a single command in order to effect the desired air charge which, in combination with the appropriate command to the fuel injectors, simultaneously minimizes errors in torque and A/F with respect to the desired torque and A/F. In conventional control terminology, this may be described as a "fast" or inner loop which regulates torque A/F over the operating range of the engine. The primary advantage of this control scheme is the elimination of "open loop" air charge estimation and, hence, improved performance. The details of this control scheme are shown in FIG. 3 and described below. In addition, to the transient, or "inner loop" control, specific control signals may be applied to the secondary throttles and fuel injectors to regulate air charge and A/F on a cylinder-by-cylinder basis. This may be thought of as a "slow" or outer loop control, and the specific control signals would be appended to the uniform transient control signals previously mentioned to produce overall control signals to the secondary throttles and fuel injectors. The particular individual cylinder signals are developed by judicious sampling and processing of the A/F and torque signals as illustrated in FIG. 5 and described in detail in the following paragraphs. A block diagram of the system illustrating the control architecture is shown in FIG. 7.

Figure 7:
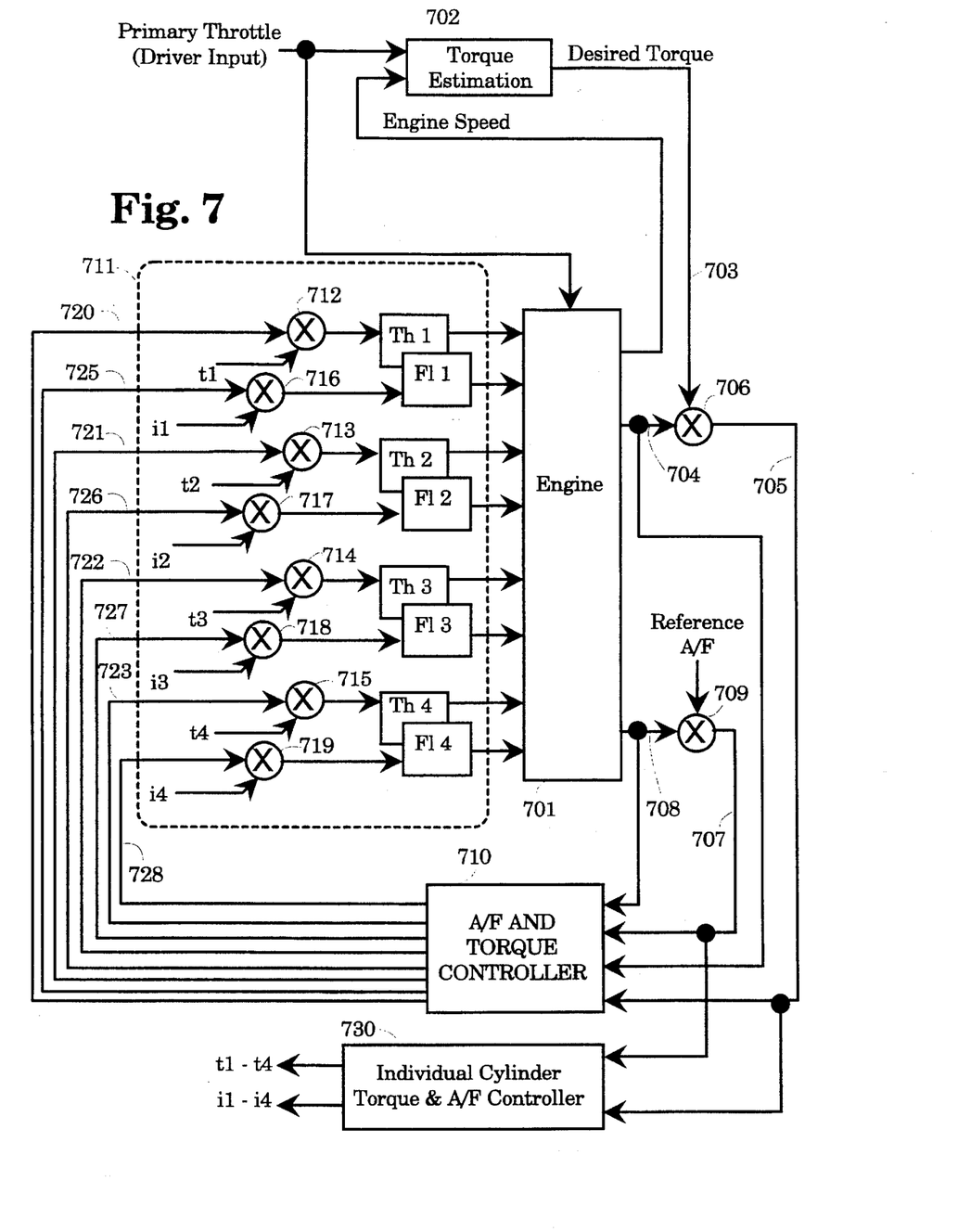
FIG. 7 is a block diagram of portions of a preferred embodiment.

In FIG. 7, a four cylinder engine 701 operates under control of a driver operated primary throttle, and a plurality of throttle and fuel control signals generated by modules Th1 through Th4 and F11 through F14 which control respectively, the air flow rate and fuel flow rate for each of the four cylinders of the engine. A desired torque value 703 is generated at 702 as a function of the primary throttle angle and engine speed. A torque difference value 705, which is indicative of a difference between the desired torque value and a value transmitted by signal 704 which is indicative of actual engine torque is generated at 706. A desired air/fuel value 707 is generated at 709 as a function of the difference between an actual A/F value 708 as generated by an oxygen sensor and a reference A/F value of stoichiometry. Values 704, 705, 707 and 708 are received by A/F and Torque Controller 710 which generates a fuel injector and throttle command signal for each cylinder of the engine for use by module 711. Values 704, 705, 707 and 708 are also received by an individual cylinder torque and A/F controller 730.

A/F and torque controller 710 transmits throttle command signals 720–724 for use by module 711 at summing elements 712–719 to generate secondary throttle command signals for the engine by use of Th1 through Th4. A/F and torque controller 710 also transmits fuel command signals 725–728 for use by module 711 at summing elements 716–719 to generate fuel injection command signals for the engine by use of F11 through F14. Individual throttle trimming control signals t1–t4 and individual fuel trimming control signals i1–i4 are generated by module 730 and described in the description accompanying FIG. 5.

Figure 6:
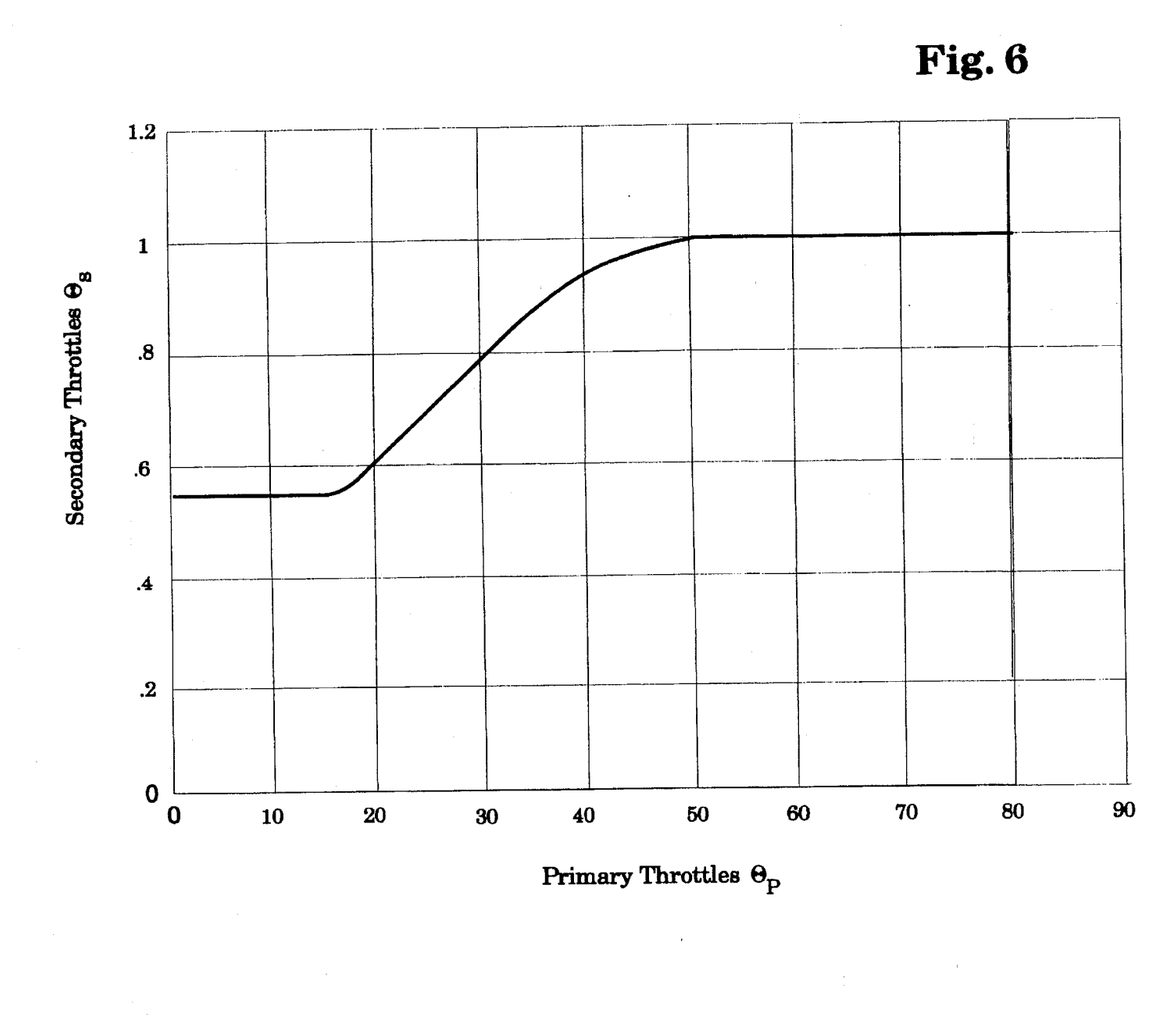
FIG. 6 is a graph showing a preferred relationship between a secondary and a primary throttle.

FIG. 3 of the drawings shows the steps executed by a preferred embodiment which includes an intake manifold as shown in FIG. 2 to implement a transient engine control routine which generates injector signal 142 and cylinder airflow signal 144 during transient operation of the engine. The steps shown in FIG. 3 preferably take the form of a stored program which is continuously executed by EEC 10. The transient engine control routine is entered at step 302 and at step 303, a primary throttle position value is determined by measuring the position of the driver operated throttle 201. At step 304, the nominal runner throttle position is updated to ensure maximal control authority over the range of operating conditions without sacrificing engine performance. A preferred relationship between the primary and secondary throttles is shown in FIG. 6. Primary throttle position is shown along the horizontal axis and secondary throttle position is shown along the vertical axis. The reasoning behind this FIG. 6 is as follows: Nominal driving conditions correspond to a partially open primary throttle (about $\theta_p=30$ degrees) interrupted by rapid requests for acceleration and deceleration, which are the main causes of A/F excursions. At the nominal part throttle operating point, the secondary throttles are positioned to provide maximum control authority in both directions (opened or closed) to react to driver demand. The relationship shown in FIG. 6 and utilized at step 304 of FIG. 3 provides a nonlinear feed forward control of the secondary throttles 211–214 to enhance drivability. As can be seen in FIG. 6, when the primary throttle 201 achieves a position greater than 60 degrees, the secondary throttles are fully open ($\theta_s=1$) and hence have control authority in only one direction: they can reduce the flow rate of air into the cylinders during acceleration to cause lower A/F excursions. On the other hand, not much can be done when the driver closes the primary throttle: the secondary throttles cannot open further to "smooth" the abrupt decrease of air flow into the manifold by providing additional air to the cylinders. Conversely, when the primary throttle is closed, the secondary throttles are positioned to provide good idle quality.

At 305, a desired torque value which is indicative of an engine torque output desired by a driver of the vehicle is generated as a function of the primary throttle position value. As will be appreciated by those skilled in the art in view of the present disclosures other engine variables such as speed may also be used to generate the desired torque value. Also generated at 305 is a desired air/fuel ratio value, which is indicative of a desired exhaust gas composition to be generated by the engine. Nominally, the desired A/F ratio value is equal to a stoichiometric A/F ratio. At 306, an actual torque value, which is indicative of an actual amount of torque generated by the engine, is preferably generated by inference from measurable, torque-related variables. An example of a preferred torque-related variable is the rate of change of engine speed as reflected by the rate of change of crankshaft speed. Engine torque may also be developed by measurement of in-cylinder pressure. Also generated at 306 is an actual air/fuel ratio value, which is indicative of an actual exhaust gas composition generated by the engine. The actual air/fuel ratio value is preferably generated as a function of an exhaust gas composition value which is indicative of the composition of exhaust gas generated by the engine. This may be the output of a switching type exhaust gas oxygen (EGO) sensor. The exhaust gas composition is representative of the oxygen content of the exhaust gas transmitted by exhaust gas composition signal 120. At 307, a torque difference value is calculated by taking the difference between the desired torque value and the actual torque value. An air/fuel difference value is also calculated at 307 by taking the difference between the desired air/fuel difference value and the actual air/fuel difference value. As will be appreciated by those skilled in the art in view of the present disclosure, each of the difference values calculated at 307 is indicative of a desired engine operating parameter and an actual engine operating parameter. At 308, each of the difference values is used to calculate a corresponding transient control value for adjusting the air flow rate and the fuel flow rate into the cylinders of the engine to bring the actual torque and air/fuel values closer to the desired values. The air flow rate transient control value and the torque transient control value are each transformed into signals 143 and 142 respectively. The routine is then exited at 309.

Figure 4:
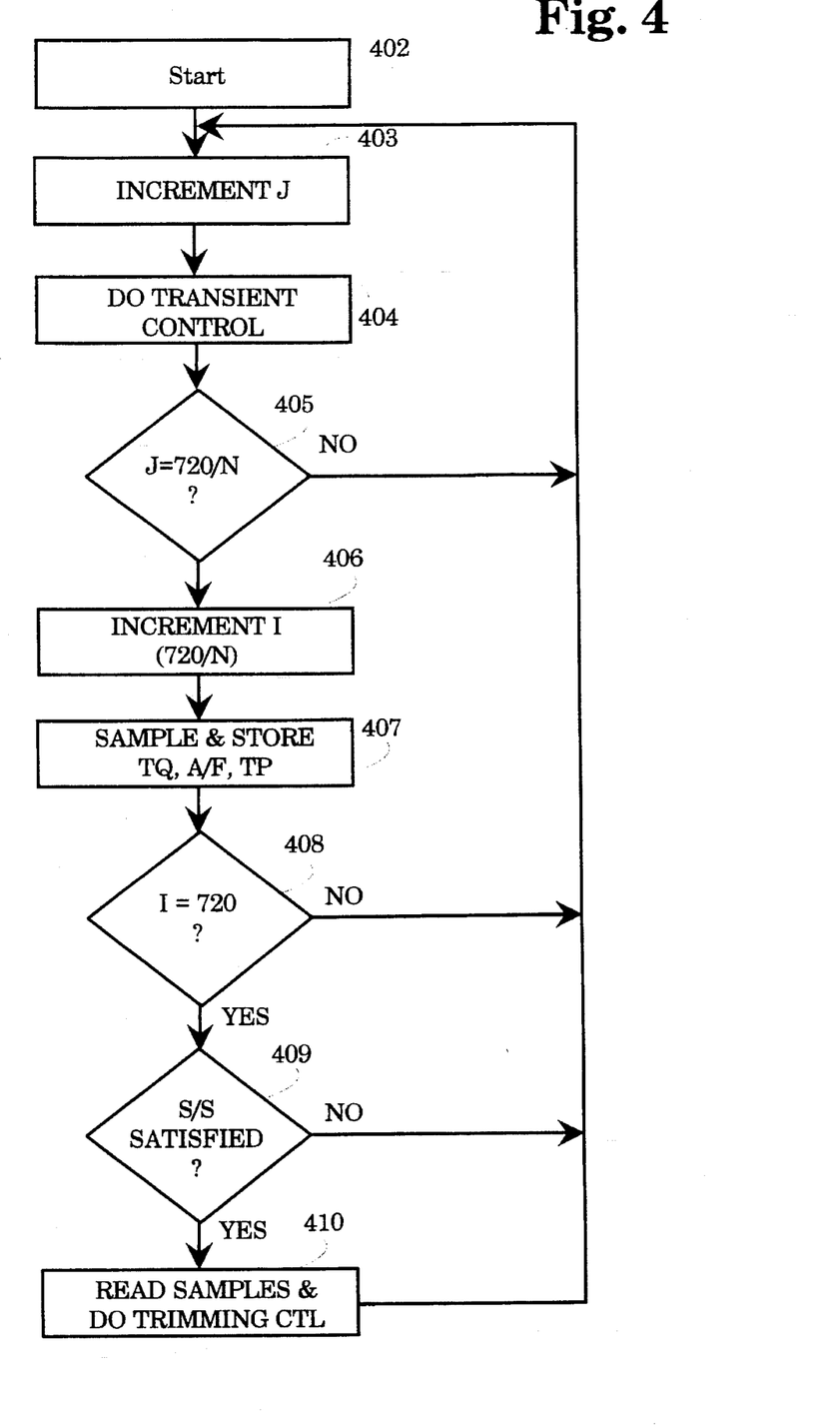

FIG. 4 of the drawings shows the steps performed by a preferred embodiment to implement an individual cylinder and transient control routine for an engine which contains individual cylinder control mechanisms to individually control the air flow rate and the fuel flow rate into each of the cylinders of the engine. Such mechanisms may take one several forms including the form shown in FIG. 2 where electronically controlled secondary throttles 203–206 individually control the air flow rate into a corresponding cylinder, and fuel injectors for each of the cylinders are individually controlled. Alternatively, the individual cylinder control mechanisms may take the form of hydraulically actuated lifter valves used in a "camless" engine. As described in U.S. Pat. No. 4,000,756, entitled High Speed Engine Valve Actuator to Ule et al.

An inner loop transient control system, as previously mentioned in conjunction with the description of FIG. 2, must operate continuously, and at a fast enough rate to react to driver and road load demands. There is significant latitude in to selection of this rate. However, it is unlikely that a rate slower than engine induction event frequency would be appropriate. On the other hand, the slower outer loop trimming controller must operate at a once per engine cycle rate, and is not meant to react to transient conditions. A preferred method of partitioning control authority between the two control loops is illustrated in FIG. 4. The steps shown in FIG. 4 advantageously allow the trimming controls to be updated if steady state operating conditions have been maintained for one engine cycle. The routine is initiated at step 402, and at step 403, the crankshaft position counter is incremented at a predetermined rate appropriate to transient control, which may preferably be single crankshaft degree increments. In step 404, the transient control previously described in FIG. 3 is performed. The test at step 405 initiates the slow, trimming control loop sample routine. Steps 406–408 correspond to the sampling and storing method previously described and illustrated as steps 502–505 in FIG. 5, with the additional requirement that the primary throttle position, TP, is also sampled and stored. Steps 408–410 effect trimming control of the secondary throttle and fuel injector signals if the steady state operating conditions of step 409 are satisfied. The test at step 409 is preferably performed by comparing the stored values of throttle position and determining that the throttle has remained stationary over the previous engine cycle.

FIG. 5 of the drawings shows in greater detail the individual cylinder air/fuel and torque control routine. Steps 502 through 505 show a preferred method of sampling the indicated torque and exhaust gas oxygen (EGO) measurements in order to effect individual cylinder control. These steps are shown in FIG. 7 at 730 which uses conventional demultiplexers and synchronizers to convert the time varying, periodic torque signal 705 and EGO signal 707 to time invariant, sampled values suitable for processing in a conventional feedback controller seen at 710 in FIG. 7(a). Stated another way, the A/F and torque signals are periodically time varying due to deviations in air charge and A/F from cylinder-to-cylinder. These periodic signals are transformed into individual signals equal in number to the number of cylinders. The signals are time invariant and can be processed by a conventional controller to regulate the engine variables of interest. This sampling method is described in detail in U.S. Pat. No. 4,962,741 and expanded herein for the case of individual cylinder torque control using the secondary throttles (or similar actuators) described previously and illustrated in FIG. 2. In step 502, a crankshaft position counter is incremented by 720/N degrees where N is the number of cylinders and 720 is the number of degrees in one complete engine cycle for a four stroke cycle engine. A four cylinder engine, for example, requires a sample rate, I of 720/4=180 degrees. In this case, steps 502 and 505 are executed 4 times, acquiring 4 samples each of torque and EGO signals. Each of these samples is stored in a separate memory location in the microprocessor in step 504. Using synchronizers in module 730 in FIG. 7, at step 506 in FIG. 5, all the samples are read from the memory locations each 720 degrees. These signals are now time invariant vectors and amenable to conventional, multivariable control processing to generate the trimming signals shown at step 507 and shown as signals t1–t4 and i1–i4 in FIG. 7. Each trimming signal is summed with the appropriate fuel injector or throttle command signal as illustrated in module 711 in FIG. 7.

It is to be understood that the specific mechanisms and techniques which have been described are merely illustrative of one application of the principles of the invention. Numerous modifications may be made to the methods and apparatus described without departing from the true spirit and scope of the invention.

What is claimed is:

1. A method for controlling an air flow rate and a fuel flow rate into cylinders of an internal combustion engine, comprising the steps of:

receiving an exhaust gas composition signal indicative of the composition of exhaust gas generated by said engine:

generating, as a function of at least one engine torque indication value, a desired torque value, indicative of an engine torque output desired by a driver of the vehicle; generating an actual torque value, indicative of an actual amount of torque generated by said engine;

generating a desired air/fuel mixture value, indicative of a desired exhaust gas composition to be generated by said engine;

generating, as a function of said exhaust gas composition signal, an actual air/fuel mixture value, indicative of an actual exhaust gas composition generated by said engine;

generating a torque difference value as a function of the difference between said desired torque value and said actual torque value;

generating an air/fuel difference value as a function of the difference between said desired air/fuel difference value and said actual air/fuel difference value;

determining the air flow rate as a function of said torque difference value;

determining the fuel flow rate as a function of said air/fuel difference value;

transmitting an air flow signal to said first means to control the amount of air entering cylinders of said engine in accordance with said air flow rate; and transmitting a fuel flow signal to said second means to control the amount of fuel delivered to cylinders of said engine in accordance with said fuel flow rate.

2. The method as set forth in claim 1 wherein the engine includes a first means for individually controlling the air flow rate into each cylinder of the engine and a second means for individually controlling the fuel flow rate into each cylinder of the engine, and wherein the method comprises the additional steps of:

generating a plurality of actual torque values, one for each cylinder of the engine, said actual torque values indicative of a torque being generated by a corresponding cylinder;

generating a plurality of actual air/fuel ratio values, one for each cylinder of the engine, each of said actual air/fuel ratio values indicative of a ratio of air and fuel combusted in a corresponding cylinder;

generating a desired torque value, indicative of an engine torque output desired by a driver of the vehicle;

generating a desired air/fuel mixture value, indicative of a desired exhaust gas composition to be generated by said engine;

generating a plurality of torque trimming values, one for each cylinder of the engine, each of said torque trimming values indicative of a difference between the actual torque value and the desired torque value which correspond to a particular cylinder;

generating a plurality of air/fuel ratio trimming values, one for each cylinder of the engine, each of said air/fuel ratio trimming values indicative of a difference between the actual air/fuel ratio value and the desired air/fuel ratio value which correspond to a particular cylinder;

generating a cylinder air flow value indicative of the air flow rate into each cylinder, as a function of the corresponding torque trimming value;

generating a cylinder fuel flow value, indicative of the fuel flow rate into each cylinder, as a function of the corresponding air/fuel ratio trimming value;

transmitting each cylinder air flow value to said first means to cause air flow into each cylinder to substantially equal the air flow indicated by the corresponding cylinder air flow value; and transmitting each cylinder fuel flow value to said second means to cause fuel flow into each cylinder to substantially equal the fuel flow indicated by the corresponding cylinder fuel flow value.

3. The method as set forth in claim 2 wherein the plurality of actual torque values are generated as a function of the rate of change of the rotational speed of the engine.

4. The method as set forth in claim 3 wherein the desired torque value is generated as a function of the angle of a driver controlled throttle plate.

5. The method as set forth in claim 4 wherein the plurality of actual air/fuel ratio values are generated as a function of the concentration of oxygen in exhaust gas generated by the engine.

6. An engine controller which controls the delivery of fuel into cylinders of an internal combustion engine, comprising, in combination:

means, responsive to an engine operating condition, for generating a desired torque value, indicative of an engine torque output desired by a driver of the vehicle;

means, responsive to a torque related engine operating condition, for generating an actual torque value, indicative of an actual amount of torque generated by said engine;

means, responsive to an oxygen sensor signal, for generating a desired air/fuel mixture value, indicative of a desired exhaust gas composition to be generated by said engine;

means, responsive to said oxygen sensor signal, for generating an actual air/fuel mixture value, indicative of an actual exhaust gas composition generated by said engine;

means, for generating a torque difference value as a function of the difference between said desired torque value and said actual torque value;

means for generating an air/fuel difference value as a function of the difference between said desired air/fuel difference value and said actual air/fuel difference value;

means, responsive to said torque difference value, for generating an air flow signal indicative of air flow into cylinders of the engine as a function of said torque difference value; and means, responsive to said air/fuel difference value, for generating a fuel flow signal indicative of the fuel flow rate into cylinders of the engine;

means for transmitting said air flow signal to cause entry of air to cylinders of said engine in accordance with said air flow signal; and means for transmitting said fuel flow signal to cause delivery of fuel to cylinders of said engine in accordance with said fuel flow signal.

7. The engine controller as set forth in claim 6 wherein the engine includes a first means for individually controlling the air flow rate into each cylinder of the engine and a second means for individually controlling the flow rate into each cylinder of the engine, and wherein the engine controller further comprises:

means, responsive to said actual torque value for generating a plurality of actual torque values, one for each cylinder of the engine, said actual torque values indicative of a torque being generated by a corresponding cylinder;

means, responsive to said actual air/fuel mixture value, for generating a plurality of actual air/fuel ratio values, one for each cylinder of the engine, said actual air/fuel ratio values indicative of a ratio of air and fuel combusted in a corresponding cylinder;

means for generating a plurality of torque trimming values, one for each cylinder of the engine, each of said torque trimming values indicative of a difference between the desired torque value and the actual torque value which corresponds to said cylinder;

means, for generating a plurality of air/fuel ratio trimming values, one for each cylinder of the engine, each of said air/fuel ratio trimming values indicative of a difference between the desired air/fuel ratio value and the actual air/fuel ratio value which corresponds to said cylinder;

means responsive to each of said torque trimming values, for generating a cylinder air flow signal, indicative of air flow to one of said individual cylinders, for each cylinder as a function of the corresponding torque trimming value;

means, responsive to each of said air/fuel ratio trimming values, for generating a cylinder fuel flow signal, indicative of fuel delivery to one of said individual cylinders, for each cylinder as a function of the corresponding air/fuel ratio trimming value;

means for transmitting each of said cylinder air flow signals to cause entry of air in a corresponding cylinder in accordance with said cylinder air flow signals; and means for transmitting each of said cylinder fuel flow signals to cause delivery of fuel to a corresponding cylinder in accordance with said cylinder fuel flow signals.

8. The engine controller as set forth in claim 7 wherein the plurality of actual torque values are generated as a function of the rate of change of the rotational speed of the engine.

9. The engine controller as set forth in claim 8 wherein the desired torque value is generated as a function of the angle of a driver controlled throttle plate.

10. The engine controller as set forth in claim 9 wherein the plurality of actual air/fuel ratio values are generated as a function of the concentration of oxygen in exhaust gas generated by the engine.

11. The engine controller as set forth in claim 10 wherein the means for generating a desired air/fuel mixture value generates said desired air/fuel mixture value as a function of the difference between the oxygen sensor signal and a predetermined reference value.

12. Apparatus for controlling the delivery of air and fuel to cylinders of an engine which includes a first means for individually controlling the air flow rate into each cylinder of the engine in response to a plurality of airflow signals, and a second means for individually controlling the fuel flow rate into each cylinder of the engine, the apparatus comprising:

a microprocessor programmed to,
generate, as a function of a torque indication value, which is indicative of an amount of torque being generated by said engine, a plurality of actual torque values, one for each cylinder of the engine, said actual torque values indicative of a torque being generated by the corresponding cylinder;

generate, as a function of an exhaust gas composition signal, a plurality of actual air/fuel ratio values, one for each cylinder of the engine, said actual air/fuel ratio values indicative of a ratio of air and fuel combusted in the corresponding cylinder;

generate, as a function of the position of a driver controlled throttle, a desired torque value;

generate, a plurality of torque trimming values, one for each cylinder of the engine, each of said torque trimming values indicative of a difference between the actual torque value of a cylinder corresponding to said torque trimming value and the desired torque value;

generate a plurality of air/fuel ratio trimming values, one for each cylinder of the engine, each of said air/fuel ratio trimming values indicative of a difference between the actual air/fuel ratio value of a cylinder corresponding to said air/fuel ratio trimming value, and the desired air/fuel ratio value;

generate as a function of said torque trimming values, a plurality of corresponding cylinder air flow values, each of said values indicative of air flow into a corresponding cylinder of said engine; and generate, as a function of said air/fuel ratio trimming values, a plurality of corresponding cylinder fuel flow values, each of said values indicative of fuel flow into a corresponding cylinder of said engine;

means for transmitting each of said cylinder air flow values to said first means; and means for transmitting each of said cylinder fuel flow values to said second means.

13. Apparatus as set forth in claim 12 wherein the plurality of actual torque values are generated as a function of the rate of change of the rotational speed of the engine.

14. Apparatus as set forth in claim 13 wherein the desired torque value is generated as a function of the angle of a driver controlled throttle plate.

* * * * *